United States Patent Office

3,480,454
Patented Nov. 25, 1969

3,480,454
SHOCK RESISTANT ALUMINA REFRACTORY
James J. Spachman, Fremont, Ohio, assignor to Basic Incorporated, Cleveland, Ohio, a corporation of Ohio
No Drawing. Continuation-in-part of application Ser. No. 545,879, Apr. 28, 1966. This application July 30, 1968, Ser. No. 748,601
Int. Cl. C04b 35/10
U.S. Cl. 106—65                                15 Claims

ABSTRACT OF THE DISCLOSURE

A ceramically bonded refractory article formed from a refractory batch of alumina and alumina-silica grain in graded sizes with approximately 0.5 to about 6 weight percent of spodumene. The batch may also include from approximately 1 to about 10 weight percent of clay as a binding agent.

---

This application is a continuation-in-part of application Ser. No. 545,879, filed Apr. 28, 1966, now abandoned.

This invention relates generally as indicated to an alumina containing refractory and more particularly to such a refractory of the ceramically bonded type having significantly increased resistance to the effects of thermal shock.

The desirability and utility of ceramically bonded refractories capable of withstanding thermal shock and resisting the penetration and corrosion of molten metals and slags have long been known. Various attempts have been made to produce suitable such refractories, as for examle, those exemplified by U.S. Patents 2,895,840 and 3,135,616, in which the refractories consist of alumina, mullite, or other alumina-silica grain, and a clay binder. While such refractories possess these characteristics to a limited extent, their utility has been restricted due to the comparatively low shock resistance which makes them unsuitable for use in operations involving high temperature or sudden changes in temperature.

It is accordingly a principal object of the present invention to provide an alumina containing ceramically bonded refractory having increased shock resistance.

Another object of this invention is to provide a ceramically bonded alumina refractory containing spodumene.

It is an additional object of this invention to provide a ceramically bonded refractory having excellent resistance to the penetration of molten metals and the corrosion of metallic slags.

Yet another object of this invention is the provision of a process for the production of such ceramically bonded refractories.

Other objects, features and advantages of this invention will be apparent to those skilled in the art after a reading of the following more detailed description.

These and other objects are achieved by a ceramically bonded refractory which is formed from a refractory batch comprising alumina, such as tabular alumina, mullite or other alumina-silica grain and spodumene. Normally, relatively small amounts of spodumene will be used as for example from about 0.5 to about 6 percent by weight based on the total weight of the batch. As will be seen more clearly from the illustrative examples set forth hereinafter, the shock resistance of ceramically bonded refractories of this type has been strikingly increased.

Spodumene, of course, is a naturally occurring mineral, i.e., a lithium aluminum silicate corresponding to the formula $Li_2O \cdot Al_2O_3 \cdot 4SiO_2$, containing about 6.5–7.5 percent $Li_2O$, and is found in monoclinic prismatic crystals and generally has a perfect prismatic cleavage. It is characteristically a mineral of the pegmatites and can be found in various countries throughout the world including Sweden, Ireland, Madagascar, Brazil and the United States.

Since spodumene contains a maximum $Li_2O$ content of 7.5 percent as noted above, it will be readily appreciated that the refractory batch contains a maximum of about 0.45 weight percent $Li_2O$. This is significant to the improved results of this invention since it is necessary to keep the lithium content of refractory articles as small as possible because such lithium compounds are low melting, and hence when included in refractory articles in sizeable quantities tend to soften and melt during use of the refractory, thereby weakening and destroying the same.

It has also been found, as will be shown by certain of the working examples which follow, that larger additions of spodumene to refractories of coarse aggregates, as in this invention, make it extremely difficult to fire the refractories and also, once the upper limit of spodumene addition has been reached, the further addition of spodumene tends to decrease rather than increase the shock resistance of the refractory body. Consequently, the indicated upper limit of 6 percent of spodumene is quite important to the improved results of this invention.

A preferred composition for the ceramically bonded refractories of this invention has at least approximately 60 percent by weight alumina in graded sizes of approximately ¼″ and smaller, and preferably from 60 to about 85 percent, approximately 10 to 30 weight percent alumina-silica grain in graded sizes of about −10 mesh Tyler sieve size and smaller, about 1 to 10 weight percent of clay and the aforementioned 0.5 to 6 percent spodumene. The spodumene is preferably present in a quantity of about 2 to about 6 weight percent, and it has been found that approximately 4 weight percent provides a ceramically bonded refractory having excellent properties.

Alumina suitable for use in this invention is preferably that known as tabular alumina or tabular corundum which, by chemical composition, is sintered aluminum oxide with a small quantity of incidental impurity having sharply angular grains of intergrown crystals and fragments of crystals of various sizes. One commercial source of such material is the Alumina Company of America under the trade designation T–60 and T–61.

The alumina-silica refractory grain which is used is preferably that known as mullite ($3Al_2O_3 \cdot 2SiO_2$), which may be purchased for example, from the Remmey Division of A. P. Green Refractories under the trade designation "Crystalite." Such mullite has the following typical properties.

| | | |
|---|---|---|
| $Al_2O_3$ | percent | 74.35 |
| $SiO_2$ | do | 24.02 |
| $TiO_2$ | do | 0.45 |
| $Fe_2O_3$ | do | 0.34 |
| CaO | do | 0.04 |
| MgO | do | 0.21 |
| Alkalies | do | 0.41 |
| Apparent specific gravity | | 2.93–3.00 |
| Apparent porosity | percent | 10.0–14.0 |
| Water absorption | do | 4.0–6.0 |

Other fused mullites are commercially available with properties similar to this material and may, of course, be utilized in this invention. Moreover, other forms of mullite may be used including calcined synthetic mullite or mullite forming materials such as sillimanite and calcined kyanite (proper adjustments, of course, being made in the proportions of these minerals and the tabular alumina to give the requisite alumina content). If desired, other high alumina containing alumina-silica grain material may be used, such as that disclosed in U.S. Patent 3,135,616 which is a sintered alumina-silica sized grain having an alumina content in the range of about 80 to 95 percent by weight, or sintered South American bauxite which also has a sufficiently high alumina-silica content.

As mentioned, a preferred embodiment of the present invention includes a clay binding material but it is to be understood that suitable refractories can be produced, as is known in the industry, without such materials as where the quantity of fines is increased and the pH value of the refractory mix is adjusted by using phosphates, carbonates or other similar materials. It is preferred, however, to utilize clay as a binder and a suitable such clay is that available under the trade name "Tennessee No. 5 Ball Clay" which has the following typical properties:

| | Percent |
|---|---|
| $Al_2O_3$ | 31.31 |
| $SiO_2$ | 51.79 |
| $TiO_2$ | 1.41 |
| $Fe_2O_3$ | 1.01 |
| CaO | 0.26 |
| MgO | 0.20 |
| $K_2O$ | 1.44 |
| $Na_2O$ | 0.87 |
| Loss on Ignition | 11.70 |

Specific gravity, 1.80.

Other clays may be used such as "Kentucky No. 5 Bond Clay," "Old Hickory TCP," and Florida and Georgia kaolin (as for example, "Ajax-P" or "Kaolex D–6"). The quantity of the clay to be used can vary to a considerable extent but normally will be a relatively small amount as for example approximately 1 to 10 percent by weight of the total batch.

In addition to the above specified ingredients, the refractory batch will also generally include sufficient water to provide flowability for the casting operation. Only a small quantity of water is used, i.e., no more than necessary to provide the desired flowability and will normally be a quantity of about 6.5 to 8 weight percent.

The batches may also include a small quantity of a suitable deflocculating agent to assist in obtaining a fluid, uniform mixture for the casting operation. Suitable such agents include sodium silicate and a water solution of a sodium salt of polymethacrylic acid. With the latter material it has been found that suitable results are achieved with approximately 1 cubic centimeter of an aqueous solution containing 25 percent of the agent per pound of the dry batch.

In general, the refractory article is produced by preparing a batch of the above-indicated ingredients and casting such into a mold of the desired configuration. Such molds, as commonly used in the ceramic industry, are of an absorptive material, such as plaster of paris or other similar material. After sufficient water has been removed to provide rigidity, the articles are removed from the mold and dried, preferably in a circulating air dryer. During drying, the temperature is kept below the boiling point of water for the first hour to prevent formation of steam which might rupture the molded article. After the first hour, the temperature may be raised to about 250° F. and maintained at such temperature for a sufficient period of time to insure complete drying. The total drying time, is of course, dependent upon the cross-sectional thickness of the article, with the greater the cross-section, the greater drying time which is necessary.

After drying, the articles are fired to a temperature above the melting point of spodumene which is approximately 2150 to about 2200° F. During such firing, it has been found that the rate of increase of the temperature must be held to a maximum of approximately 10° F. per hour within the range of from about 1750 to 1875° F. in order to permit the alpha spodumene to convert to beta spodumene at a relatively slow rate in order to prevent the accompanying volume increase resulting from the crystal conversion from rupturing the refractory. After the heating has passed through such temperature range, the refractory may be heated at a higher temperature, such as approximately 50° F. per hour or higher as conditions permit.

The maximum firing temperature will be normally within the range of from 2450 to about 2750° F., and the refractory will be held at such temperature for a period of approximately three to six hours, with about four hours being the preferred time. The holding time will, of course, depend upon the dimensions and weight of the refractory with the smaller refractories needing a shorter firing time than the larger ones.

The reasons for the improved properties in refractory articles made in accordance with the present invention are not clearly known, but it is believed that such improved properties, and particularly the improved shock resistance, may be related to the inversion or change in crystal structure which spodumene undergoes when heated to a temperature above its melting point. When such change in crystal structure occurs, the spodumene changes from a very dense crystal form to a less dense crystal form with consequent expansion on the order of 30 percent and thus will be in a form capable of withstanding greater impact and temperatures or temperature changes.

Refractory articles produced in accordance with this invention have been found to be very suitable for use as a refractory tube in an apparatus for pouring and casting of molten metals such as that of U.S. Patent 3,162,909. Prior to this invention, such refractory tubes have been formed from a plurality of tubular sections due to the fact that the refractory materials have not been capable of withstanding the thermal shock resulting from the sudden introduction of molten steel. It is very desirable, however, to be able to make such tubes as a single piece body, and this may be accomplished utilizing the refractory compositions set forth herein. Such refractory articles may also be used as crucibles for use in the pressure casting of steel, as kiln saggers and car tops and the like.

This invention will be better understood by reference to the following specific but non-limiting examples.

Example I

The batch used in this example had the following composition:

| | Weight percent |
|---|---|
| Mullite —10+20 m. | 15 |
| Mullite —20+60 m. | 5 |
| T 60 Alumina —¼+8 m. | 10 |
| T 60 Alumina —8+14 m. | 15 |
| T 60 Alumina —14 m. | 20 |
| T 60 Alumina —325 m. | 30 |
| Tenn. #5 ball clay | 4 |
| Spodumene —200 m. (uncalcined) | 1 |

(All mesh sizes are Tyler sieve sizes)

The weight of this batch was 22 pounds, and approximately 8 percent by weight of water was added to provide a flowable mixture for casting. Also, approximately 22 cc. of the aforementioned water solution of a sodium salt of polymethacrylic acid was added as a deflocculating agent to assist in obtaining a fluid and uniform mixture. After thoroughly mixing the batch, it was cast into plaster of paris molds to produce 6" tubular specimens with a 6" outside diameter and a 3" inside diameter.

After sufficient water was removed to provide rigidity, the specimens were removed from the mold and dried as previously described. The specimens were thereafter fired to a temperature of approximately 2640° F. During the firing cycle, the rate of increase in temperature within the range from 1750° to 1875° F. was maintained at approximately 10° F. per hour. After the temperature had increased beyond 1875° F., the rate of increase was set at approximately 50° F. per hour.

After specimens were produced by the above-described method, they were tested to determine the resistance to the influence of thermal shock by the following procedure. The tubular specimens were preheated in an electric resistance heated kiln to a temperature of approximately 1800° F. Simultaneously, ferrous metal was melted in a crucible in an induction melting furnace and heated to a temperature of approximately 2900° F. After the molten metal and tubular specimens attained the prescribed temperatures, the specimens were removed from the kiln and placed in a bed of sand approximately ½″ thick which acted as a seal for one end of the tubes. The molten steel was thereafter poured into the tubes to within ½″ of the top. When the metal began to enter the tubes, timing was commenced and the time lapse was recorded from this point until a crack in the tubes was observed visually which signified the end of the test. In this particular test, the average time required for a crack to appear in two specimens was 65 seconds.

Example II

The procedure of Example I was followed, with the refractory composition differing from that of Example I only by the spodumene content which was 2 weight percent and the −325 mesh alumina content which was 29 percent by weight. The procedure of making the tubular specimens was identical with that of Example I, as was the testing procedure described therein. In this example, an average time of 120 seconds were required to develop a crack in three specimens.

Example III

The procedure of Examples I and II was followed, with the refractory composition differing from that of Examples I and II only by the spodumene content which was 5 weight percent and the −325 mesh alumina content which was 26% by weight. The procedure of making the tubular specimens was identical with that of Examples I and II as was the testing procedure described therein. In this example, an average time of 92 seconds were required to develop a crack in 2 specimens.

Example IV

The procedure of the preceding examples was followed, with the refractory composition differing from such examples only by the spodumene content which was 3 weight percent and the −325 mesh alumina content being 28 percent by weight. The procedure of making the tubular specimen was identical with that of the preceding examples as was the testing procedure described therein. In this example, an average time of 120 seconds were required to develop a crack in two specimens.

Example V

The procedure of the preceding examples was again followed and the refractory batch had the following composition:

|  | Weight percent |
|---|---|
| Mullite −20+20 m. | 11.25 |
| Mullite −20+60 m. | 3.75 |
| T 60 Alumina −8+14 m. | 19.25 |
| T 60 Alumina −14 m. | 19.25 |
| T 60 Alumina −325 m. | 36.5 |
| Tenn. #5 ball clay | 4.0 |
| Spodumene −200 m. (uncalcined) | 6.0 |

(All mesh sizes are Tyler sieve sizes)

Tubular specimens 6″ high with a 6″ outside and 3″ inside diameter were produced as described in Example I and tested to determine shock resistance by the method of Example I. The average time required to develop a crack in two specimens was 110 seconds.

Example VI

The procedure of the preceding examples was again followed with the composition differing from that of Example V by use of 5 weight percent of spodumene. Test specimens were produced as in the previous examples and tested in the same manner to determine the resistance to shock. The average time required to develop a crack in two specimens was 60 seconds.

Example VII

The procedure of the preceding examples was followed with the spodumene content of the refractory batch of this example being 4.0 weight percent. Specimens were produced as in the preceding examples, with the maximum firing temperature varying between 2450° F. to 2750° F. for the individual specimens, and tested to determine their thermal shock resistance. The average time required for a crack to develop in 21 specimens was 135 seconds.

Example VIII

In order to contrast the test results for the thermal shock resistance of refractories produced in accordance with this invention, a control run was made in which no spodumene was used, the spodumene content being replaced by Georgia kaolin. The composition of the refractory batch was then as follows:

| Mullite −10+20 m. | 11.25 |
|---|---|
| Mullite −20+60 m. | 3.75 |
| T 60 Alumina −8+14 m. | 19.25 |
| T 60 Alumina −14 m. | 19.25 |
| T 60 Alumina −325 m. | 38.5 |
| Tenn. #5 ball clay | 4.0 |
| Spodumene −200 m. | — |
| Kaolin | 4.0 |

All mesh sizes are Tyler sieve sizes)

Test specimens were produced in accordance with the preceding examples and were also tested to determine the time necessary for a crack to develop as in the preceding examples. In this example, an average time of only 25 seconds was required for a crack in 4 specimens to develop.

Example IX

To show the effects of spodumene additions greater than 6 percent, the following four runs were made. The composition of the refractory batch was as follows, with the spodumene content being 7, 8, 9 and 10 percent and the −325 mesh alumina being 35.50, 34.50, 33.50 and 32.50 percent for the four runs.

| Mullite −10+20 m. | 11.25 |
|---|---|
| Mullite −20+60 m. | 3.75 |
| T 60 Alumina −8+14 m. | 19.25 |
| T 60 Alumina −14 m. | 19.25 |
| T 60 Alumina −325 m.[1] | 35.50 |
| Tenn. #5 ball clay | 4.0 |
| Spodumene [1] | 7.0 |

(Mesh sizes are Tyler sieve sizes)

[1] Percentage varies as noted above.

Test specimens were produced for each of the four runs in accordance with the preceding examples, but cracks developed during the initial firing in each case and the specimens had to be discarded.

An analysis of the foregoing examples indicates quite vividly the improved results of the present invention since the shock resistance of the refractories of this invention has been increased by a factor of at least well over 2 times that of refractories produced by the same procedure but which do not include spodumene. Such examples also show the decrease in resistance to shock and cracking when the spodumene is greater than 6 percent, a comparison of Examples VIII and IX actually showing that refractory bodies having no spodumene had better resistance to shock than those having from 7 to 10 percent of spodumene.

Other modes of applying the principle of the invention may be employed, change being made as regards the details described, provided the features stated in any of the following claims, or the equivalent of such, be employed.

I therefore particularly point out and distinctly claim as my invention:

1. A ceramically bonded refractory article formed from a refractory batch comprising at least approximately 60 weight percent alumina in graded sizes of approximately ¼" and smaller, approximately 10 to 30 weight percent alumina-silica grain in graded sizes of approximately −10 mesh Tyler sieve size and smaller, and approximately 0.5 to about 6 weight percent spodumene, said batch containing a maximum of approximately 0.45 weight percent $Li_2O$.

2. The refractory batch of claim 1 wherein said batch contains approximately 2 to 6 weight percent spodumene.

3. The refractory article of claim 2 wherein said batch contains approximately 4 weight percent spodumene.

4. The refractory of claim 1 wherein said alumina-silica grain is mullite.

5. The refractory article of claim 1 wherein said alumina is tabular alumina.

6. A refractory batch consisting essentially of approximately 60 to 85 weight percent alumina in graded sizes of approximately ¼" and smaller, about 10 to about 30 weight percent alumina-silica grain in graded sizes of approximately −10 mesh Tyler sieve size and smaller, approximately 1 to about 10 weight percent clay, and from about 0.5 to 6 weight percent spodumene, said batch containing a maximum of approximately 0.45 weight percent $Li_2O$.

7. The batch of claim 6 in which said spodumene is approximately 2 to 6 weight percent.

8. The batch of claim 7 in which said spodumene is approximately 4 weight percent.

9. The batch of claim 6 in which said alumina-silica grain is mullite and said alumina is tabular alumina.

10. A process of producing a fired refractory article, comprising forming a refractory article from a batch comprising at least approximately 60 weight percent alumina, approximately 10 to 30 weight percent alumina-silica grain and about 0.5 to about 6 weight percent spodumene, and subsequently firing said article to a temperature above the melting point of said spodumene with a maximum rate of increase in temperature of approximately 10° F. per hour within the temperature range from about 1750 to about 1875° F.

11. The process of claim 10 in which approximately 1 to about 10 weight percent of clay binder is included in the refractory batch.

12. The process of claim 10 in which approximately 2 to about 6 weight percent of spodumene is used.

13. A fired refractory article formed from a refractory batch comprising approximately 60 to about 85 weight percent tabular alumina in graded sizes of approximately ¼" and smaller, approximately 10 to 30 weight percent mullite in graded sizes of approximately −10 mesh Tyler sieve size and smaller, and about 0.5 to about 6 weight percent uncalcined spodumene, said batch containing a maximum of approximately 0.45 weight percent $Li_2O$.

14. The refractory article of claim 13 in which approximately 1 to about 10 weight percent of clay is included in said batch.

15. A ceramically bonded refractory article formed from a refractory batch consisting essentially of approximately 60 to about 85 weight percent alumina in graded sizes of approximately ¼" and smaller, approximately 10 to 30 weight percent alumina-silica grain in graded sizes of approximately −10 mesh Tyler sieve size and smaller, approximately 1 to about 10 weight percent clay, and approximately 0.5 to about 6 weight percent of naturally occurring spodumene, said batch containing a maximum of approximately 0.45 weight percent $Li_2O$.

References Cited

UNITED STATES PATENTS 3,135,616  6/1964  Norton _____ 106—65

FOREIGN PATENTS 964,807  7/1964  Great Britain.

JAMES E. POER, Primary Examiner

U.S. Cl. X.R.

106—67